United States Patent [19]

Skoultchi et al.

[11] 4,069,123

[45] Jan. 17, 1978

[54] CROSSLINKED PRESSURE SENSITIVE ADHESIVE COMPOSITIONS

[75] Inventors: Martin M. Skoultchi, Somerset; Irwin J. Davis, Somerville, both of N.J.

[73] Assignee: National Starch & Chemical Corporation, Bridgewater, N.J.

[21] Appl. No.: 300,294

[22] Filed: Oct. 24, 1972

[51] Int. Cl.$^2$ .................................................. C08F 8/00
[52] U.S. Cl. ........................... 204/159.18; 204/159.14; 427/54; 526/46; 526/54; 526/208; 526/317; 526/328
[58] Field of Search .............. 260/78.5 R; 204/159.15, 204/159.18, 159.22, 159.23, 159.14; 427/54; 526/46, 54, 208, 317, 328

[56] References Cited

U.S. PATENT DOCUMENTS

| 2,986,507 | 5/1961 | Barney et al. ................... 204/159.18 |
| 3,046,127 | 7/1962 | Steck ................................ 204/159.23 |
| 3,427,161 | 2/1969 | Laridon et al. .................... 96/115 R |
| 3,787,212 | 1/1974 | Heimsch et al. ................. 204/159.24 |

*Primary Examiner*—Murray Tillman
*Assistant Examiner*—Thurman K. Page
*Attorney, Agent, or Firm*—James & Franklin

[57] ABSTRACT

Improved pressure sensitive adhesive compositions based on acrylate ester polymers and the substrates coated therewith. The improved adhesive and cohesive properties result from the addition to the polymer of specified quinone ultraviolet sensitizers and the subsequent crosslinking thereof by exposure to an ultraviolet source.

14 Claims, No Drawings

CROSSLINKED PRESSURE SENSITIVE ADHESIVE COMPOSITIONS

This invention relates to acrylic-based pressure sensitive adhesives which have been admixed with ultraviolet sensitizers and then crosslinked by ultraviolet irradiation so as to improve their adhesive and cohesive strength.

As is known in the art, pressure sensitive adhesives comprise a class of adhesive compositions which may be formulated from a variety of materials such as gums and resins of both natural and synthetic derivation. When coated on a suitable substrate, these adhesive compositions share the common characteristic of being aggressively and permanently tacky at room temperature and are thus able to adhere to surfaces by the application of nothing more than manual pressure. Adhesives of this type may be applied to various substrates such as paper, cloth and plastic films and the resulting coated substrates may then be converted to tapes and labels which are especially useful in the packaging field for any number of applications involving marking, sealing, reinforcing or banding.

In order to be satisfactory in commercial usage, a pressure sensitive adhesive must, of course, possess good tack and tack retention properties; that is, the adhesive must firmly adhere to various surfaces and the adhesive films thereof should continue to toughen on aging. An equally important property of such an adhesive in many applications is that of high internal strength, i.e. good cohesion. High internal or cohesive strength is a necessary characteristic of any adhesive composition which is to be employed in preparing adhesive products which must support considerable amounts of weight. It is also necessary that the property of high internal strength be instilled in a pressure sensitive adhesive without adversely affecting its tack and tack retention properties. Previously, internal strength had been imparted to pressure sensitive adhesives by such means as incorporating high molecular weight polymers in the adhesive formulation. Methods such as this one, however, have generally proved unsatisfactory since cohesive strength was attained only at the expense of sacrificing the tack and adhesion properties of the composition.

In preparing pressure sensitive adhesives, it has also been necessary to carefully coordinate the viscosity and adhesive properties thereof. Thus, the practitioner's desire to utilize lower solids contents and/or high molecular weight resins in order to achieve optimum pressure sensitive properties, has necessarily been limited by the fact that the viscosity of such a system would exceed the acceptable levels for coating purposes. Accordingly, the practitioner has frequently had to compromise in one or both of these areas in order to prepare an operable system.

It is the object of this invention to prepare pressure sensitive adhesives which display excellent properties of tack, tack retention and cohesive strength and which are characterized by their ready adhesion to a wide variety of substrates.

It is a further object to improve the cohesive strength of pressure sensitive adhesives based upon acrylate ester polymers without adversely affecting their tack and adhesion properties.

It is still a further object to provide such improved properties by a technique which permits the use of a broad range of viscosities and solids contents in the basic adhesive composition.

Another object of this invention is the use of said adhesives to prepare pressure sensitive tapes and labels.

Other objects and advantages of this invention will become apparent from the following description.

In accordance with the invention, the cohesive strength of acrylate ester-based pressure sensitive adhesives is improved by a crosslinking technique wherein ultraviolet sensitizers, as defined hereinbelow, are extraneously added to the polymer composition, the composition is coated onto the desired substrate, and the adhesive coating is exposed to an ultraviolet source for a period of time sufficient to crosslink the adhesive composition. This crosslinking technique effects a substantial improvement in the pressure sensitive properties of the adhesive compositions. Furthermore, it improves cohesive strength without sacrificing the tack and adhesion properties of the compositions. Since the crosslinking operation is conducted subsequent to the coating step, there is no requirement that the adhesive compositions exhibit optimum adhesive properties prior to deposition but merely that they exhibit an appropriate coating viscosity. The practitioner is thus given far greater flexibility as to the resin molecular weights and total solids contents utilized for any particular adhesive composition. In addition, the crosslinking procedure is very versatile inasmuch as it is equally applicable to pressure sensitives in solution, emulsion or hot melt form. It represents a vast improvement over prior art techniques for increasing cohesive strength due to the fact that it provides a broad spectrum of improved properties without relying on the addition of high molecular weight polymers or the undesirable use of heat to combine chemically reactive additives with corresponding reactive groups on the polymer.

Pressure sensitive adhesives based on acrylate ester homo and copolymers are well known to those skilled in the art. It is to be noted that the crosslinking technique of this invention has general applicability to all such pressure sensitive adhesives. With regard to the acrylic-based random polymers which may be used in the adhesive composition of this invention, these may include (1) homopolymers of alkyl esters of acrylic and methacrylic acid such as methyl acrylate, ethyl acrylate, propyl acrylate, butyl acrylate, pentyl acrylate, hexyl acrylate, heptyl acrylate, octyl acrylate, nonyl acrylate, decyl acrylate, undecyl acrylate and dodecyl acrylate, as well as the corresponding methacrylate esters; and (2) copolymers of one or more of the acrylate and methacrylate esters listed hereinabove with at least one other copolymerizable monomer selected from the group consisting of vinyl esters such as vinyl acetate and vinyl propionate; vinyl ethers such as vinyl methyl ether and vinyl ethyl ether; vinyl halides such as vinyl chloride; vinylidene halides such as vinylidene chloride; ethylenically unsaturated carboxylic acids such as acrylic, methacrylic, crotonic, itaconic, maleic and fumaric acids; nitriles of ethylenically unsaturated monocarboxylic acids such as acrylonitrile; anhydrides of ethylenically unsaturated dicarboxylic acids such as maleic anhydride; and $C_1$–$C_4$ alkyl half esters of maleic and fumaric acids such as methyl hydrogen maleate and butyl hydrogen fumarate. It should be noted that various pressure sensitive adhesives based on acrylate ester polymers are disclosed in U.S. Pat. Nos. 3,535,295 and 3,575,925.

The polymers which are applicable for use in our novel adhesive products should preferably have a minimum acrylate or methacrylate monomer content of about 35%, by weight, in order to exhibit sufficient pressure sensitive properties. The other monomer components and the concentrations in which they are used in the polymer will then be determined on the basis of the properties desired in the final product and the specific end-use application. In all cases, the resulting polymer will generally have a Williams plasticity value ranging from extremely low, immeasurable values to a value of about 2.5. It should be noted that after crosslinking of the polymer by exposure to ultraviolet light in accordance with this invention, the polymers will generally exhibit a Williams plasticity value ranging from about 1.2 to 5.5. It is to be understood that the value after crosslinking will always be higher than the value before crosslinking.

Plasticity may be defined as the property of a polymeric material which enables it to be deformed permanently and continuously, without rupture, upon the application of a force thereto. This property is measured by the use of a William's Plastometer which is manufactured by Scott Testers, Inc. and is designed to conform to the standards set by ASTM Method D-926.

In determining Williams plasticity values, a film, having a dry thickness of 2–3 mils, of the copolymer being evaluated, is cast onto a conventional release sheet. The dry film is peeled from the release sheet and molded into a solid cylindrical slug approximately 9/16 inch wide, 2 centimeters long, and weighing exactly 1.8 grams. The slug is then conditioned for 15 minutes at a temperature of 100° F whereupon it is inserted between the two parallel platens of the plastometer which have also been maintained at a temperature of 100° F. The upper platen which is weighted with 5 kilograms and is attached to a micrometer which serves to measure the height of the slug after compression, is lowered onto the slug and maintained in the position for 15 minutes. The resulting micrometer readings, in millimeters, indicate the resistance to plastic flow on the part of the polymer samples being evaluated. High plasticity values are indicative of greater resistance to flow and, thus, denote a firmer polymer whereas low plasticity values are indicative of less resistance to flow, and, thus, denote a softer polymer.

As will be recognized by those skilled in the art, the preparation of the above described random polymers can be carried out using well-known free radical initiated polymerization procedures. Thus, the polymers may be prepared in lacquer form by heating a mixture of the selected monomers together with an appropriate organic solvent such as methylene chloride, ethyl acetate, ethyl formate, heptane, cyclohexane, toluene and the like, in the presence of a free radical initiator such as azobisisobutyronitrile or benzoyl peroxide. Likewise, the polymers may be prepared in latex form by reacting an aqueous emulsion of the respective monomers in the presence of the free radical initiator. In either instance, the resin solids content of the polymer solution or emulsion should exceed about 20%, by weight.

The acrylate polymer can also be prepared in 100% solids hot melt form in order to benefit from the advantages inherent in hot melt products, e.g. ease of storage, shipping, application, and the like. Such hot melts are prepared by solution polymerization of the selected monomers according to the above described procedure, followed by removal of the total solvent content and cooling so as to provide the dry, solid hot melt form.

With regard to the quinone ultraviolet sensitizers which are to be used according to this invention and are to be added to the above described acrylic-based polymers, these are selected from the group of polynuclear quinones corresponding to the formulae:

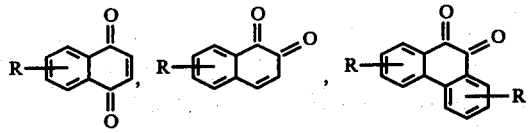

wherein R is selected from the group consisting of hydrogen, halogens, alkyl radicals, aryl radicals and alkoxy radicals.

Applicable quinone compounds include phenanthrenequinone; 1,4-naphthoquinone; 1,2-naphthoquinone; 6-chloro-1,2-naphthoquinone; 6-bromo-1,4-naphthoquinone; 2-methyl-phenanthrenequinone; 2-isopropyl, 8-methyl-phenanthrenequinone; 6-methoxy-1,2-naphthoquinone; 6-propoxy-1,4-naphthoquinone; and the phenyl, naphthyl and anthrancenyl derivatives of phenanthrenequinone and naphthoquinone. Phenanthrenequinone and naphthoquinone are preferred, on the basis of performance and availability.

In the practice of this invention, the above-described quinone sensitizers are admixed with the acrylic-based polymers while the latter are in either solution or latex form. For those polymers which are to be converted into hot melt form, the sensitizer is added to the solution polymer prior to the removal of the solvent therefrom. In order to provide effective crosslinking upon subsequent exposure to ultraviolet light, the quinones should be added to the polymers in concentrations ranging from about 0.1–10.0%, as based on the weight of polymer solids, and preferably from about 0.5–2.0%.

If desired, conventional additives may be incorporated into the novel adhesives of our invention in order to modify the properties thereof. Among these additives may be included: plasticizers, such as dioctyl phthalate, or resins such as hydrogenated methyl esters of rosin and diethylene glycol esters of rosin; fillers or pigments, such as talc and clay; and anti-oxidants, such as hindered phenols.

In using the novel adhesives of our invention for the preparation of labels, decals, tapes, and the like, they may be applied to substrates by means of any coating technique whose use is desired by the practitioner. Thus, these modified copolymer lacquers and emulsions may be sprayed onto a selected film backing or they may be applied by use of any mechanical coating process such as air knife, trailing blade, knife coater, reverse roll, or gravure coating techniques. In addition, the adhesive may be applied by transfer of the adhesive from a release sheet onto the selected backing. The adhesives which are in hot melt form are applied in a molten state by means of any conventional hot melt coating method such, for example, as knife coating, roller coating, spraying and dipping, etc. The adhesives are generally applied at coating weights which yield a dry film thickness in the range of about 0.4 to 3.0 mils. The coating weights at which these adhesives are applied will, of course, vary according to the particular polymer used, the selected substrate, and the specific contemplated end-product.

Our adhesives may be coated onto a virtually unlimited variety of substrates, including paper, cloth, paperboard, metal sheets and foils, fiber glass, foamed plastics, rubber, cellophane, wood and plastic films and sheets, such as those derived from polyethylene terephthalate, polystyrene, rubber hydrochloride, polyethylene, polypropylene, polyvinyl chloride and polyvinylidene chloride. Moreover, these novel adhesive products may be used for the bonding and lamination of any of the above listed substrates.

Subsequent to application, the adhesive films cast from lacquers or emulsions are dried to remove the organic or aqueous solvent, while the molten hot melts are cooled in order to solidify the adhesive film. The resulting adhesive coatings of this invention are characterized by their sensitivity to ultraviolet light and thus are readily crosslinked by exposure thereto.

In order to crosslink the adhesives of this invention, it is merely necessary to expose the adhesive film to an ultraviolet source, i.e. to radiation having a wavelength of 2000 to 4000 A., for a period of time which is sufficient to accomplish the desired amount of crosslinking and yet will not result in any undesirable degradation of the polymer, said degradation being manifested by discoloration and a marked deterioration in the physical properties of the polymer composition. The length of exposure will also be dependent on the source of radiation as well as on the distance between the source and the adhesive film.

As noted, the crosslinking procedure is conducted on the adhesive after it has been coated onto the desired substrate, i.e. formed into a shaped article. This sequence of steps is preferred inasmuch as the precipitation or gellation which results from the crosslinking of the polymers while in liquid form, interferes with the subsequent substrate application of the adhesive film.

The crosslinked adhesive is now characterized by its resistance to solvents in which it would ordinarily dissolve or soften, by its increased Williams plasticity value, and, more importantly, by its superior pressure sensitive properties.

In order to demonstrate the characteristics of tack, tack retention and cohesion of the novel adhesive copolymers of this invention, the tests, as described below, may be employed.

180° "Hold" Test. — This test measures a combination of adhesive and cohesive properties. In conducting this test, films of the adhesives being evaluated are applied to a polyethylene terephthalate film backing in a 3 mil wet thickness. The test samples, which are one inch in width and three inches in length, are securely adhered by thumb pressure to the top of a ½-inch chrome-steel bar tilted 180° from the vertical; the dimensions of the adhered area being ½-inch by 1 inch. The portion of the sample that extends downward is folded back approximately 1 inch and a 500-gram weight is secured to its lower extremity. The time required for the sample to fail, that is, for the film to separate or delaminate from the bar, is recorded as the 180° hold time.

After failure occurs, "transfer" observations are made to determine the amount of adhesive transferring from the sample and thus adhering to the metal bar. Needless to say, it is advantageous to have cohesive transfer with samples exhibiting a long "hold" time.

180° Peel Adhesion Test. — This standard adhesion test, as described in ASTM D-1000, serves to measure the internal strength of the adhesive compositions of this invention. The samples are prepared in the manner described in the 180° "Hold" Test, above. The test consists of measuring the force necessary to strip or delaminate the adhesive test sample at a 180° angle from a stainless steel panel at a rate of pull of 12 inches per minute. An Instron Tensile Tester is used to provide the pulling force. Thus, the force necessary to effect delamination is recorded as the 180° peel force.

In the following examples, which further illustrate the embodiment of our invention, all parts are given by weight unless otherwise noted.

EXAMPLE I

This example illustrates the preparation of an adhesive composition typical of this invention.

The pressure sensitive adhesive utilized in this example was a 50:50 2-ethylhexyl acrylate:vinyl acetate solution copolymer in an ethyl acetate solvent system. The resin solids content of the lacquer was 40% while its Williams plasticity value was 1.90.

Thereafter, 0.4 parts of phenanthrenequinone was dissolved in 100 parts of the above-described pressure sensitive adhesive. Both the modified and unmodified adhesive compositions were cast onto polyethylene terephthalate films and the solvent evaporated to produce adhesive films having a dry thickness of 1.0 mil. The adhesive films were then exposed, for varying periods of time, to a 275 watt General Electric RS sunlamp which was positioned at a distance of 12 inches from the film samples. The crosslinked and non-crosslinked adhesives were then evaluated by means of the above described "180° Hold" and "180° Peel" adhesion tests. The results of these evaluations are presented in the following table:

|  | U.V. exposure (min.) | 180° Peel (ounces) | 180° Hold (hours) |
|---|---|---|---|
| Control (no sensitizer) | 0 | 27 | 12¼ |
|  | 4 | 26 | 12¼ |
| Sensitized Adhesive | 0 | 29 | 12¼ |
|  | 4 | 23 | 48+ |

The results summarized above clearly show the increased cohesive strength of adhesive copolymers crosslinked in accordance with the process of this invention.

The above-described sensitization, crosslinking and testing procedures were identically repeated with the exception that the following polymer compositions were utilized in lieu of the ethylhexyl acrylate-vinyl acetate system:

1. an n-butyl acrylate homopolymer in an ethyl acetate solvent system at a total solids content of 67%, by weight;
2. a 65:35 octyl acrylate: vinyl acetate copolymer in an ethyl acetate solvent system at a total solids content of 49%, by weight.

In each instance, the improved adhesive properties of the cross-linked adhesive were comparable to those described for the 50:50 ethylhexyl acrylate: vinyl acetate system.

EXAMPLE II

The general procedures of Example I were repeated utilizing the 50:50 ethylhexyl acrylate:vinyl acetate copolymer with the exception that the polymer system contained 12%, by weight, of polyvinyl methyl ether tackifier and, further, that a variety of sensitizers were utilized. These recipe changes and the test data for the resulting adhesives are presented in the following table:

| Sensitizer | Sensitizer Concentration (%, on weight of polymer solids) | U.V. Exposure Time (min.) | 180° Peel (ounces) | 180° Hold (hours) |
| --- | --- | --- | --- | --- |
| none | — | — | 34 | 2 |
| phenanthrenequinone | 1.2 | 2 | 26 | 48+ |
| 1,4-naphthoquinone | 1.2 | 2 | 31 | 48+ |
| 1,2-naphthoquinone | 1.2 | 2 | 30 | 48+ |

The data summarized above further illustrates the class of sensitizers which can be effectively utilized in accordance with our process to provide improved pressure sensitive adhesive properties.

The above described procedure may be repeated under identical conditions utilizing any acrylic-based polymer containing a combination of any of the polymerizable monomers listed hereinabove; any polynuclear quinone corresponding to the chemical structures depicted hereinabove; and a wide variety of sensitizer concentrations and crosslinking conditions. It is anticipated that improved pressure sensitive properties will be obtained in each instance.

EXAMPLE III

This example illustrates the use of a hot melt pressure sensitive adhesive in accordance with this invention.

A solution polymer of 50% vinyl acetate, 30% octyl acrylate and 20% ethyl acrylate in an ethyl acetate solvent having a Williams plasticity of 0.95, was modified by the dissolution therein of 0.6% phenanthrenequinone, as based on the weight of polymer solids. The total solvent content of the solution polymer was removed in order to produce a 100% solids hot melt adhesive composition. The hot melt was then heated to 135°–150° C. and the resulting molten composition coated onto a polyethylene terephthalate film to produce a pressure sensitive adhesive film having a one mil dry thickness. The adhesive film was then exposed to a ultraviolet source for a period of 4 minutes under the conditions described in Example I, hereinabove. The resulting crosslinked product was seen to exhibit improved cohesive strength as contrasted to the non-crosslinked control sample.

The above-described procedure was repeated with the exception that (1) a 50:50 2-ethylhexyl acrylate:vinyl acetate polymer was utilized as the hot melt, (2) 0.3% phenanthrenequinone, as based on the weight of polymer solids, was added to the polymer, and (3) the U.V. exposure time was 2 minutes. Once again, a substantial improvement was noted in the cohesive strength of the resulting crosslinked adhesive composition.

Summarizing, it is seen that this invention provides improved acrylic-based pressure sensitive adhesive compositions and a novel crosslinking approach for upgrading the adhesive properties thereof.

Variations may be made in proportions, procedures and materials without departing from the scope of this invention as defined by the following claims.

We claim:

1. A pressure sensitive adhesive composition comprising a blend of:
    1. a pressure sensitive adhesive polymer selected from the class consisting of:
        i. homopolymers of alkyl esters of acrylic and methacrylic acids and
        ii. copolymers of at least one alkyl ester of acrylic and methacrylic acid present in an amount of at least 35% by weight of the copolymer together with at least one other polymerizable comonomer; and
    2. from about 0.1–10.0%, as based on the weight of polymer solids, of a quinone compound corresponding to the formulae:

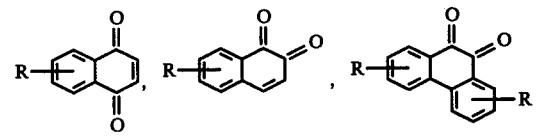

wherein R is selected from the group consisting of hydrogen, halogen, alkyl radicals, aryl radicals and alkoxy radicals.

2. The adhesive composition of claim 1, wherein said copolymerizable comonomer is selected from the group consisting of vinyl esters, vinyl esters, vinyl halides, vinylidene halides, ethylenically unsaturated carboxylic acids, nitriles of ethylenically unsaturated monocarboxylic acids, anhydrides of ethylenically unsaturated dicarboxylic acids and $C_1$–$C_4$ alkyl half esters of maleic and fumaric acids.

3. The adhesive composition of claim 1, wherein said adhesive polymer has a Williams plasticity of up to about 2.5.

4. The adhesive composition of claim 1, which is in the form of an organic solvent solution.

5. The adhesive composition of claim 1, which is in the form of an aqueous emulsion.

6. The adhesive composition of claim 1, which is in solid form.

7. The adhesive composition of claim 1, wherein said quinone compound is present in a concentration of from about 0.5–2.0%, as based on the weight of polymer solids.

8. The adhesive composition of claim 7, wherein said quinone compound is selected from the group consisting of phenanthrenequinone, 1,4-naphthoquinone and 1,2-naphthoquinone.

9. A process for improving the adhesive and cohesive properties of pressure sensitive adhesive compositions based on pressure sensitive adhesive polymers containing moieties therein derived from alkyl esters of acrylic and methacrylic acid, said process comprising the steps of:

A. blending (1) a pressure sensitive adhesive polymer selected from the class consisting of:
  i. homopolymers of alkyl esters of acrylic and methacrylic acids and
  ii. copolymers of at least one alkyl ester of acrylic and methacrylic acid present in an amount of at least 35% by weight of the copolymer together with at least one other copolymerizable comonomer; with (2) from about 0.1-10%, as based on the weight of polymer solids of a quinone compound corresponding to the formulae:

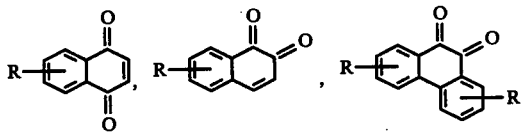

wherein R is selected from the group consisting of hydrogen, halogen, alkyl radicals, aryl radicals, and alkoxy radicals; and B. exposing said pressure sensitive adhesive blend to radiation having a wavelength of from about 2000 to 4000 A for a period of time sufficient to effect crosslinking thereof.

10. The process of claim 9, wherein said copolymerizable comonomer is selected from the group consisting of vinyl esters, vinyl ethers, vinyl halides, vinylidene halides, ethylenically unsaturated carboxylic acids, nitriles of ethylenically unsaturated monocarboxylic acids, anhydrides of ethylenically unsaturated dicarboxylic acids and $C_1$-$C_4$ alkyl half esters of maleic and fumaric acids.

11. The process of claim 9, wherein prior to irradiation, said adhesive polymer has a Williams plasticity of up to about 2.5.

12. The process of claim 9, wherein said quinone compound is present in a concentration of from about 0.5-2.0%, as based on the weight of polymer solids.

13. The process of claim 12, wherein said quinone compound is selected from the group consisting of phenanthrenequinone, 1,4-naphthoquinone and 1,2-naphthoquinone.

14. The crosslinked pressure sensitive adhesive composition prepared by the process of claim 9.

* * * * *